(12) United States Patent
Nakamura et al.

(10) Patent No.: US 10,567,193 B2
(45) Date of Patent: Feb. 18, 2020

(54) IN-VEHICLE CONTROL DEVICE

(71) Applicant: KEIHIN CORPORATION, Shinjuku-ku, Tokyo (JP)

(72) Inventors: Yuta Nakamura, Utsunomiya (JP); Yuzuru Takashima, Utsunomiya (JP)

(73) Assignee: KEIHIN CORPORATION, Tokyo (JP)

( * ) Notice: Subject to any disclaimer, the term of this patent is extended or adjusted under 35 U.S.C. 154(b) by 58 days.

(21) Appl. No.: 15/648,869

(22) Filed: Jul. 13, 2017

(65) Prior Publication Data

US 2018/0069725 A1 Mar. 8, 2018

(30) Foreign Application Priority Data

Sep. 7, 2016 (JP) .................................. 2016-174771

(51) Int. Cl.
*H04L 12/40* (2006.01)

(52) U.S. Cl.
CPC ............... *H04L 12/40143* (2013.01); *H04L 2012/40215* (2013.01); *H04L 2012/40273* (2013.01)

(58) Field of Classification Search
None
See application file for complete search history.

(56) References Cited

U.S. PATENT DOCUMENTS

2007/0208470 A1* 9/2007 Itabashi .............. H04L 12/4135
701/36

FOREIGN PATENT DOCUMENTS

| JP | 62001051 A | 1/1987 |
|----|------------|--------|
| JP | 3807299 B2 | 8/2006 |
| JP | 2007-245891 A * | 9/2007 |
| JP | 2007245891 A | 9/2007 |
| JP | 2015135599 A | 7/2015 |

OTHER PUBLICATIONS

JP Notice of Reasons for Rejection corresponding to Application No. 2016-174771; dated Nov. 14, 2017.

* cited by examiner

*Primary Examiner* — Ayaz R Sheikh
*Assistant Examiner* — Sori A Aga
(74) *Attorney, Agent, or Firm* — Cantor Colburn LLP

(57) ABSTRACT

An in-vehicle control device connected to an in-vehicle LAN system conforming to a CAN protocol, when an output signal output from a second controller maintains a dominant level for a predetermined time, determines that there is an abnormality in the output signal output from the second controller, and converts the output signal output to a selection section from the second controller into a signal of a recessive level.

1 Claim, 3 Drawing Sheets

IN-VEHICLE CONTROL DEVICE

CROSS-REFERENCE TO RELATED APPLICATION

The present invention claims priority under 35 U.S.C. § 119 to Japanese Patent Application No. 2016-174771 filed in Japan on Sep. 7, 2016, the entire content of which is incorporated herein by reference.

BACKGROUND OF THE INVENTION

Field of the Invention

The present invention relates to an in-vehicle control device.

Description of Related Art

In the related art, a communication system which transmits or receives a binary logic signal constituted of a signal of a dominant level (Low level) and a signal of a recessive level (High level) via a differential two-wire communication bus has been used for communication between a plurality of in-vehicle control devices (hereinafter, referred to as an Electronic Control Unit (ECU)) mounted on a vehicle (for example, Japanese Patent No. 3807299).

Japanese Patent No. 3807299 discloses a communication system in which binary logic signals from a plurality of modules in one ECU in which the plurality of modules (CPU) for calculating binary logic signals for executing each function of a vehicle are integrated can be transmitted or received to or from other ECUs using a communication driver connected to a communication bus.

The ECU in this communication system includes a logic circuit (for example, an AND circuit) which selects a signal having a high priority among the binary logic signals output from the plurality of modules and outputs the selected signal to the communication driver. When a signal of a dominant level is input from at least one of the modules, this logic circuit preferentially output the signal of the dominant level to the communication driver using a logical product.

Here, when it is determined that a module performs communication with lower priority than other modules, the module continuously transmits a signal of a recessive level to the logic circuit so as not to hinder communication of other modules. Therefore, a signal from a module outputting a signal with a higher priority is preferentially selected in the logic circuit.

SUMMARY OF THE INVENTION

However, when an abnormality occurs in a module, a signal of a dominant level is continuously transmitted to a logic circuit from the module in some cases. In this case, a binary logic signal output to a communication driver from a logic circuit is maintained as a signal of the dominant level regardless of a binary logic signal of other normal modules. That is, even when a signal of a recessive level from a normal module is input to a logic circuit, the logic circuit selects a signal of the dominant level from a module in which an abnormality has occurred and outputs the signal to a communication driver. For this reason, communication in the normal module is hindered by the module in which an abnormality has occurred.

An aspect of the present invention has been made in view of such circumstances, and an object of the present invention is to provide an in-vehicle control device in which communication of other modules is not hindered even when an abnormality occurs in a module.

In order to solve the above problems, the present invention has adopted the following aspect.

(1) An in-vehicle control device according to an aspect of the present invention is an in-vehicle control device connected to an in-vehicle LAN system conforming to a CAN protocol, and includes first and second controllers configured to perform an operation on a signal for executing a predetermined function and to output the signal as an output signal which is a signal of a dominant level signal or a recessive level, a communication driver configured to perform communication via a bus line in the in-vehicle LAN system, a selection section configured to select one of a plurality of output signals output from the first and second controllers and to output the output signal to the communication driver, and an output adjustment section capable of adjusting an output signal output to the selection section from the second controller to a signal of the dominant level or the recessive level, in which the first controller includes an output monitoring unit configured to determine that, when an output signal output from the second controller is at the dominant level for a predetermined time, there is an abnormality in the output signal output from the second controller, and the output adjustment section converts an output signal output to the selection section from the second controller into a signal of the recessive level when the output monitoring unit determines that there is an abnormality.

(2) In the aspect of (1) described above, the first controller further may include a signal output unit configured to output an abnormality signal indicating an abnormality to the output adjustment section when the output monitoring unit determines that there is an abnormality in the output signal from the second controller, in which the output adjustment section may perform a logic operation on the output signal from the second controller and the abnormality signal, thereby converting the output signal into a signal of the recessive level and outputting the converted signal to the selection section.

According to the aspect of the present invention, it is possible to provide an in-vehicle control device in which communication of other modules is not hindered even when an abnormality occurs in a module.

DETAILED DESCRIPTION OF THE INVENTION

Figure 1:
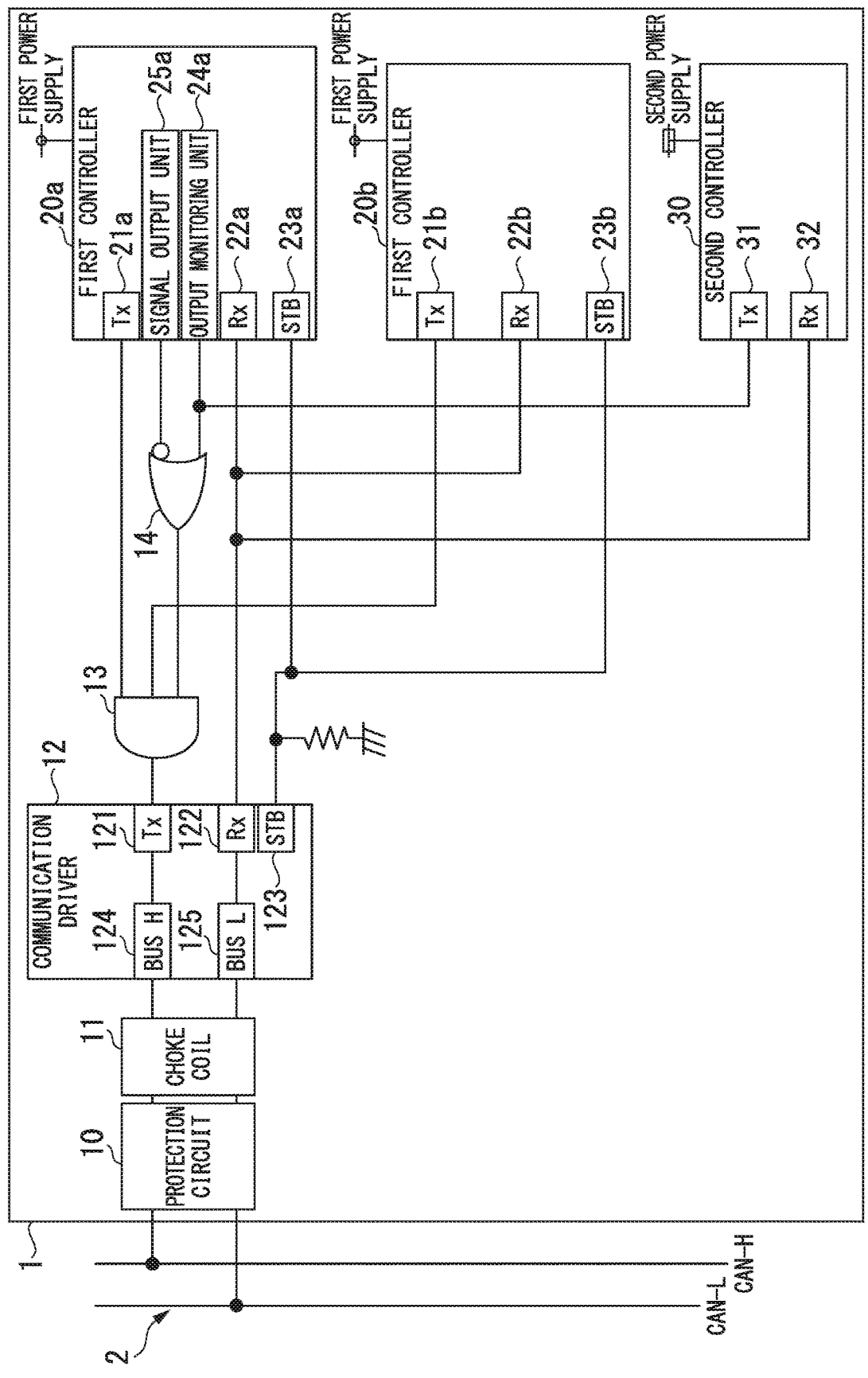
FIG. 1 is a diagram which shows an example of a schematic configuration of an in-vehicle control device 1 according to an embodiment of the present invention.

Hereinafter, the present invention will be described through an embodiment of the invention, but the following embodiment does not limit the invention according to claims. In addition, all combinations of features described in the embodiment are not essential to solving means of the invention. In drawings, the same or similar portions are denoted by the same reference numerals, and thereby duplicative description is omitted in some cases.

Hereinafter, an in-vehicle control device of an embodiment will be described with reference to the drawings.

FIG. 1 is a diagram which shows an example of a schematic configuration of an in-vehicle control device 1 according to an embodiment.

An in-vehicle control device according to the present embodiment (hereinafter, referred to as an ECU) 1 is connected to an in-vehicle LAN system conforming to a Controller Area Network (CAN) protocol. In addition, a plurality of ECUs 1 performing communication in conformity with the CAN protocol are connected to the in-vehicle LAN system via a bus line 2. In the CAN protocol, a two-wire communication line made of a CAN-H line and a CAN-L line is used as the bus line 2.

The ECU 1 includes a protection circuit 10, a choke coil 11, a communication driver 12, a selection section 13, an output adjustment section 14, first controllers 20a and 20b, and a second controller 30.

The protection circuit 10 prevents an invasion of a surge from the bus line 2 into the ECU 1.

The choke coil 11 trims waveforms of signals transmitted and received between the ECU 1 and the bus line 2, and removes noise.

The communication driver 12 performs communication (transmits signals) in conformity with the CAN protocol via the bus line 2 in the in-vehicle LAN system. The communication driver 12 causes a voltage difference between the CAN-H line and the CAN-L line and communicates data "1" and "0" on the bus line 2 using this voltage difference in the CAN protocol. In the CAN protocol, a logic 0 is defined as a dominant level and a logic 1 is defined as a recessive level. In the CAN protocol, a CPU or an ECU outputting the dominant level occupies the bus line 2. Accordingly, if the bus line 2 is fixed at the dominant level and occupied, the other ECUs 1 cannot perform communication at all.

The communication driver 12 includes a transmission terminal Tx121, a reception terminal Rx122, a standby terminal STB123, a bus H terminal 124, and a bus L terminal 125.

Signals output from the first controllers 20a and 20b are input to the transmission terminal Tx121. The reception terminal Rx122 outputs reception signals received by the communication driver 12 from other ECUs 1.

A standby signal from the first controllers 20a and 20b is input to the standby terminal STB123. The bus H terminal and the bus L terminal are terminals for transmitting a signal by causing a voltage difference between a CAN-H line and a CAN-L line of the bus line 2. This communication driver 12 is in a state in which it can communicate when a level of the standby terminal STB123 is the recessive level (High level).

The first controllers 20a and 20b (for example, a Central Processing Unit (CPU)) are modules that perform operation processing on a signal for executing a predetermined function of a vehicle such as motor control. That is, the first controllers 20a and 20b execute control processing and the like for controlling each unit of an automobile as the ECU 1 or execute processing for performing communication with other ECUs, and are embedded with a CAN controller which controls CAN communication according to the CAN protocol.

The second controller 30 (for example, a CPU) executes control processing and the like for controlling each unit of an automobile as the ECU 1 or executes processing for performing communication with other ECUs, and is embedded with a CAN controller which controls CAN communication according to the CAN protocol.

Here, the first controllers 20a and 20b, and the second controller 30 operate using different power supplies. That is, the first controllers 20a and 20b operate using a first power supply, and the second controller 30 operates using a second power supply. The first controllers 20a and 20b, and the second controller 30 may be configured in separate units. in this case, the second controller 30 is connected to a communication driver of a unit on which the first controllers 20a and 20b are mounted and communicates with other ECUs.

The first controller 20a includes a transmission terminal Tx21a, a reception terminal Rx22a, a standby terminal STB23a, an output monitoring unit 24a, and a signal output unit 25a. The first controller 20b includes a transmission terminal Tx21b, a reception terminal Rx22b, and a standby terminal STB23b. The second controller 30 includes a transmission terminal Tx31 and a reception terminal Rx32.

The transmission terminals Tx21a and Tx21b are connected to the selection section 13, respectively. The reception terminals Rx22a and Rx22b are connected to the reception terminal Rx122, respectively.

The first controller 20a receives a reception signal from the reception terminal Rx122 using the reception terminal Rx22a. The first controller 20a performs an operation on a signal for executing a predetermined function on the basis of the received reception signal and outputs the signal after the operation from the transmission terminal Tx21a as an output signal which is a signal of the dominant level or the recessive level.

The first controller 20b receives a reception signal from the reception terminal Rx122 using the reception terminal Rx22b. The first controller 20b performs an operation on a signal for executing a predetermined function on the basis of the received reception signal and outputs the signal after the operation from the transmission terminal Tx21b as an output signal which is a signal of the dominant level or the recessive level.

The standby terminals STB23a and STB23b are connected to the standby terminal STB123, respectively. The first controller 20a outputs a standby signal which instructs an operation state of the communication driver 12 from the standby terminal STB23a. The first controller 20b outputs a standby signal which instructs an operation state of the communication driver 12 from the standby terminal STB23b. For example, the standby terminals STB23a and STB23b are at the recessive level only during communication, and are at the dominant level when communication is not required.

The output monitoring unit 24a is connected to the transmission terminal Tx31 of the second controller 30.

The output monitoring unit 24a determines that there is an abnormality in an output signal output from the second controller 30 when the output signal output from the transmission terminal Tx31 of the second controller 30 is at the dominant level for a predetermined time.

The signal output unit 25a is connected to the output adjustment section 14 via a NOT circuit. When the output monitoring unit 24a determines that an output signal of the second controller 30 is abnormal, the signal output unit 25a outputs an abnormality signal indicating this abnormality to the output adjustment section 14. For example, the abnormality signal is a signal causing the output adjustment section 14 to output a signal of the recessive level and is a signal of the dominant level, and a signal of the recessive level which is inverted by the NOT circuit is input to the output adjustment section 14.

In the present embodiment, a case in which the signal output unit 25a is connected to the output adjustment section 14 via the NOT circuit is described, but the present invention is not limited thereto. For example, the signal output unit 25a may be connected to the output adjustment section 14 without going through the NOT circuit. In this case, the signal output unit 25a outputs a signal of the recessive level as an abnormality signal.

The transmission terminal Tx31 of the second controller 30 is connected to the output adjustment section 14 and the output monitoring unit 24a. The reception terminal Rx32 of the second controller 30 is connected to the reception terminal Rx122.

The second controller 30 receives a reception signal from the reception terminal Rx122 using the reception terminal Rx32. The second controller 30 performs an operation on a signal for performing a predetermined function on the basis of the received reception signal, and outputs the signal after the operation from the transmission terminal 31 as an output signal which is a signal of the dominant level or the recessive level. The second controller 30 outputs an output signal of the recessive level from the transmission terminal 31 when operation processing of a signal is not performed (at a time of non-communication).

The selection section 13 selects one of a plurality of output signals output from the first controllers 20a and 20b and the second controller 30, and outputs the selected signal to the communication driver 12.

Specifically, the selection section 13 is connected to the transmission terminals 21a and 21b and an output terminal of the output adjustment section 14, respectively. For example, the selection section 13 is an AND circuit. Therefore, the selection section 13 preferentially outputs a signal of the dominant level among output signals output from each of the transmission terminals 21a and 21b and the output terminal of the output adjustment section 14 to the communication driver 12 using a logical product of the output signals.

The output adjustment section 14 adjusts an output signal output to the selection section 13 from the second controller 30 to a signal of the dominant level or the recessive level. Then, the output adjustment section 14 converts the output signal output to the selection section 13 from the second controller 30 into a signal of the recessive level when the output monitoring unit 24a determines that an output signal of the second controller is abnormal.

For example, when the output adjustment section 14 is an OR circuit and the output monitoring unit 24a determines that an output signal from the second controller is abnormal, the output adjustment section 14 acquires an abnormality signal from the signal output unit 25a. Accordingly, the output adjustment section 14 performs a logic operation on an output signal from the second controller 30 and an abnormality signal, thereby converting the output signal into a signal of the recessive level and outputting the converted signal to the selection section 13. As a result, when the output monitoring unit 24a determines that an output signal of the second controller is abnormal, the selection section 13 selects an output signal of one of the first controllers 20a and 20b among a plurality of output signals output from the first controllers 20a and 20b and the second controller 30. The OR circuit described above may be configured by a wired OR circuit.

Figure 2:
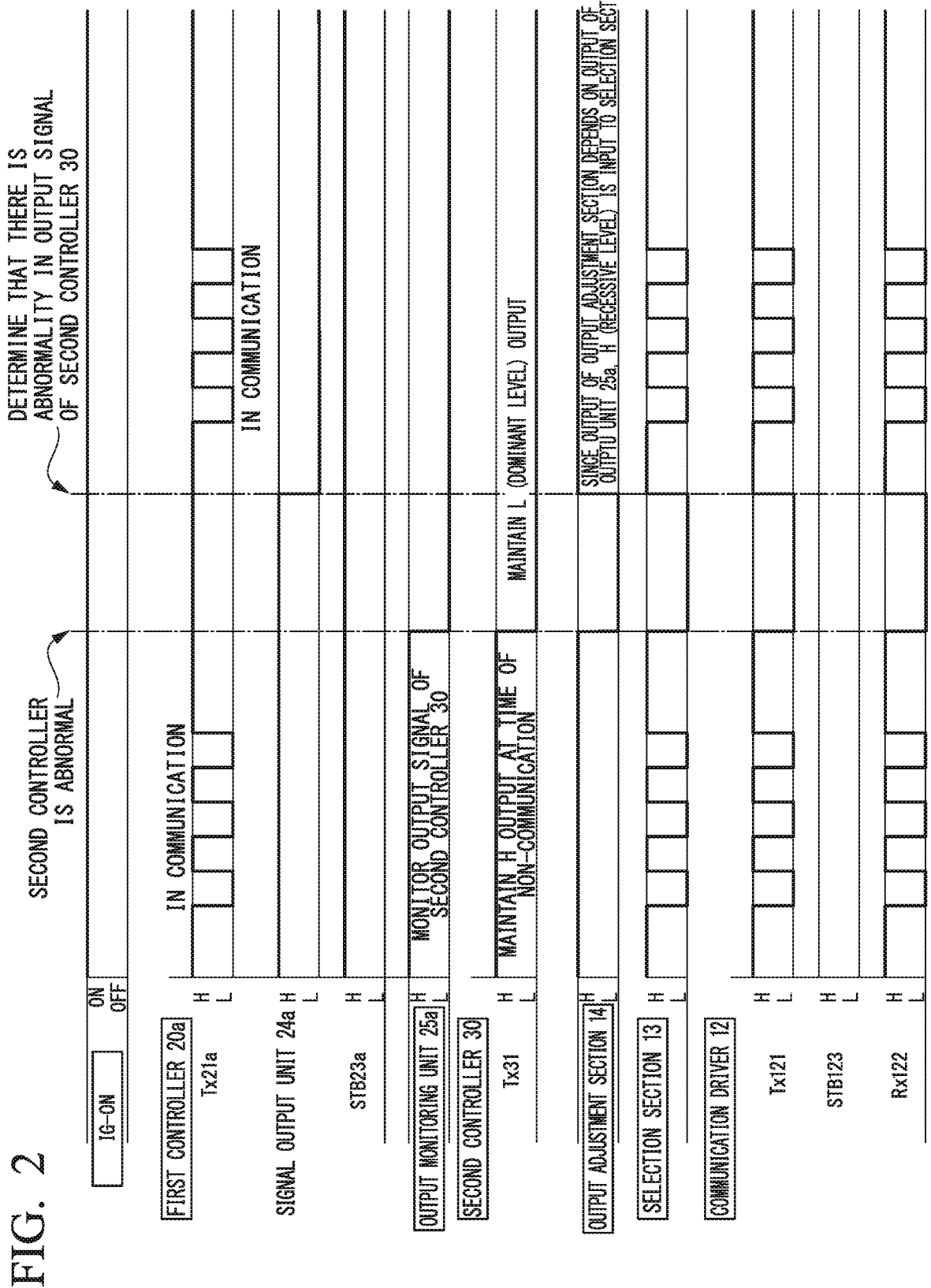
FIG. 2 is a time chart of operations of the in-vehicle control device 1 according to an embodiment of the present invention.
Figure 3:
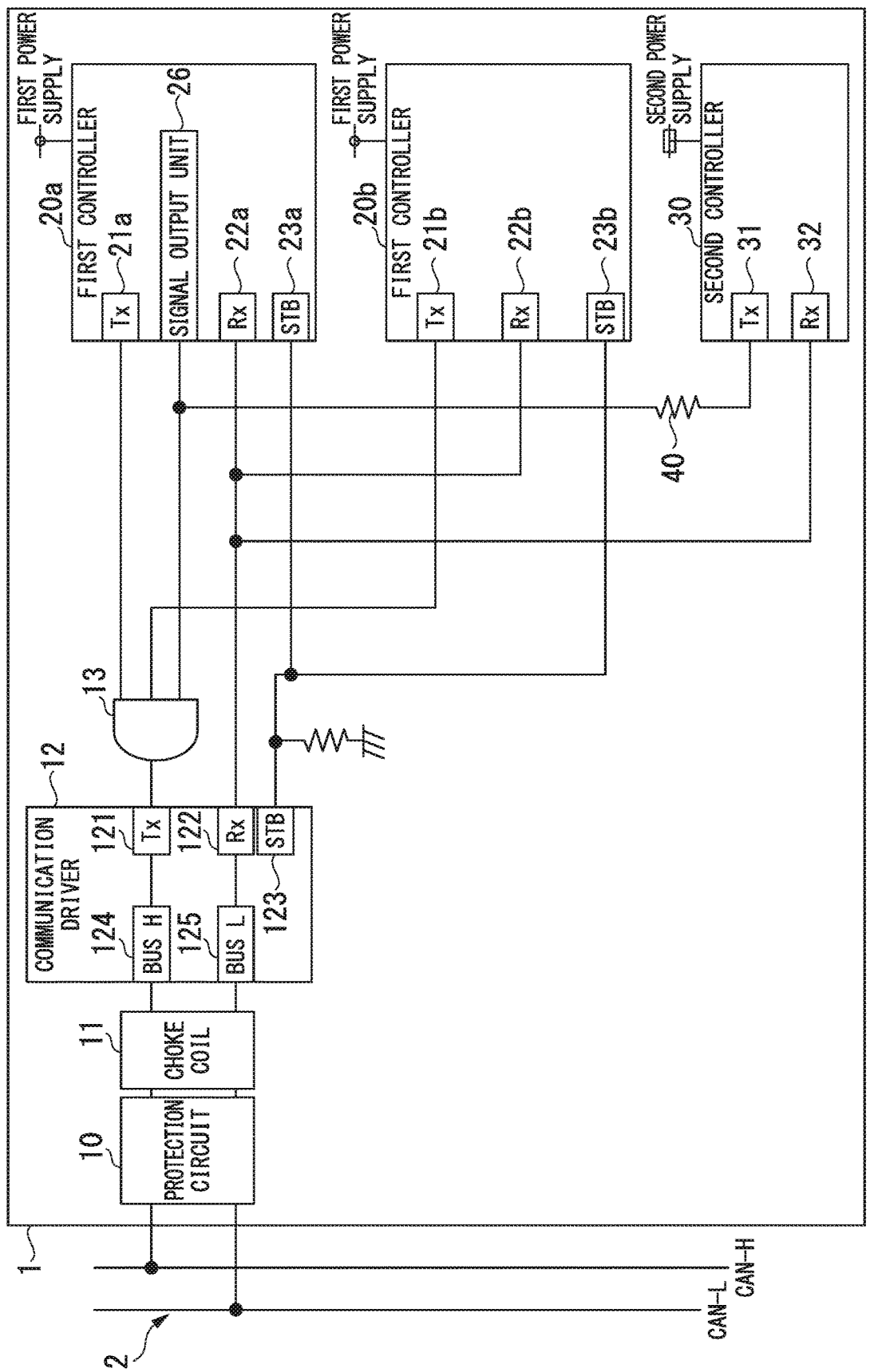
FIG. 3 is a diagram which shows a modified example of the in-vehicle control device 1 according to an embodiment of the present invention.

Next, an operation of the ECU 1 according to the present embodiment will be described with reference to FIG. 2. FIG. 2 is a time chart of the operation of the ECU 1 according to the present embodiment. In the present embodiment, for convenience, a description of the first controller 20b will be omitted. In addition, a case in which an initial state of the second controller 30 is a non-communication state will be described in the present embodiment.

If an ignition is turned on, the first controller 20a outputs an output signal from the transmission terminal Tx21a. In this case, the standby terminal STB23a is at the recessive level. For this reason, the first controller 20a is in communication and an output signal of the first controller 20a is input to the selection section 13. Here, since the second controller 30 is in a non-communication state, an output signal of the recessive level is output from the transmission terminal Tx31. In other words, an output signal of the recessive level from the second controller 30 is input to the output adjustment section 14 and the output monitoring unit 24a.

In this case, the output monitoring unit 24a does not detect a signal of the dominant level for a predetermined time, and thus does not determine that there is an abnormality in an output signal output from the second controller 30. Therefore, the signal output unit 25a outputs a signal of the recessive level instead of an abnormal signal which is a signal of the dominant level, to the output adjustment section 14. Accordingly, the output adjustment section 14 adjusts an output signal from the signal output unit 25a and an output signal input from the second controller 30, and outputs a signal of the recessive level to the selection section 13. As a result, a signal of the recessive level from the output adjustment section 14 and an output signal of the first controller 20 are input to the selection section 13. Therefore, the selection section 13 selects the output signal of the first controller 20a and outputs the selected signal to the transmission terminal Tx121 of the communication driver 12.

Here, it is assumed that an abnormality has occurred in the second controller 30 and an output signal of the dominant level is output from the transmission terminal Tx31 and maintained. In this case, an output signal of the dominant level from the second controller 30 is continuously input to the output monitoring unit 24a and the output adjustment section 14.

Accordingly, a signal of the dominant level from the output adjustment section 14 and an output signal of the first controller 20a are input to the selection section 13. The selection section 13 preferentially selects a signal of the dominant level. For this reason, the selection section 13 selects the signal of the dominant level output from the second controller in which an abnormality has occurred, instead of the output signal of the first controller 20a, and continuously outputs the selected signal to the transmission terminal Tx121 of the communication driver 12.

However, in this case, the output signal of the dominant level from the second controller 30 is continuously input to the output monitoring unit 24a. Accordingly, when the output signal output from the second controller 30 is at the dominant level for a predetermined time, the output monitoring unit 24a determines that there is an abnormality in the output signal output from the second controller 30 due to a certain problem. Then, when the output monitoring unit 24a determines that there is an abnormality in the output signal of the second controller 30, the signal output unit 25a outputs an abnormality signal to the output adjustment section 14 and a signal inverted by the NOT circuit is input to the output adjustment section 14. The abnormality signal in this case is a signal of the dominant level.

As a result, the output adjustment section 14 outputs a signal of the recessive level to the selection section 13. Therefore, the signal of the recessive level from the output adjustment section 14 and the output signal of the first controller 20a are input to the selection section 13. For this reason, the output adjustment section 14 selects the output signal of the first controller 20a and outputs the selected signal to the transmission terminal Tx121 of the communication driver 12. Accordingly, even when an abnormality occurs in the second controller 30, communication of the first controller 20a or 20b is not hindered.

As described above, when an output signal output from the second controller 30 is at the dominant level for a predetermined time, the ECU 1 according to the present embodiment determines that there is an abnormality in the output signal output from the second controller 30, and adjusts the output signal output from the second controller 30 so as not to hinder communication of the first controller 20a. For example, the ECU 1 converts the output signal output from the second controller 30 into a signal of the recessive level. As a result, the selection section 13 preferentially selects an output signal from the first controller 20a or 20b which is normal, instead of the signal from the second controller 30 in which an abnormality has occurred, and outputs the selected signal to the communication driver 12. Accordingly, even when an abnormality occurs in the second controller 30, communication of the first controller 20a or 20b is not hindered.

Hereinafter, a modified example of the ECU 1 according to the present embodiment will be described. The ECU 1 of the modified example has a configuration in which the output adjustment section 14 is not included and a signal control unit 26 having a function of the output monitoring unit 24a and a function of the signal output unit 25a are included in the first controller 20a. This signal control unit 26 is connected to the transmission terminal Tx31 of the second controller 30 via a resistor 40. In addition, the signal control unit 26 is connected to the selection section 13.

When an output signal output from the transmission terminal Tx31 of the second controller 30 is at the dominant level for a predetermined time, the signal control unit 26 determines that there is an abnormality in the output signal output from the second controller 30. Then, the signal control unit 26 is switched from an input port to an output port, and outputs an abnormality signal of the recessive level to the selection section 13.

Each unit of the ECU 1 may be realized by hardware, may be realized by software, or may be realized by a combination of hardware and software. In addition, a computer may function as a part of the ECU 1 by executing a program. The program may be stored in a computer readable medium or may be stored in a storage device connected to a network.

As described above, the embodiment of this invention has been described with reference to drawings, but a specific configuration is not limited to this embodiment and includes designs and the like within a scope not departing from the gist of the present invention.

What is claimed is:
1. An in-vehicle control device which is connected to an in-vehicle LAN system conforming to a CAN protocol, the device comprising:
   first and second controllers configured to perform an operation on a signal for executing a predetermined function and to output the signal as an output signal which is a signal of a dominant level or a recessive level;
   a communication driver configured to perform communication via a bus line in the in-vehicle LAN system;
   a selection section which is a single AND circuit and is configured to select one of a plurality of output signals output from the first and second controllers and to output the output signal to the communication driver; and
   an output adjustment section which is a single OR circuit and is capable of adjusting an output signal output from the second controller to the selection section to a signal of the dominant level or the recessive level,
   wherein the first controller includes
       an output monitoring unit configured to determine that, when an output signal output from the second controller is the dominant level for a predetermined time, there is an abnormality in the output signal output from the second controller, and
       a signal output unit configured to output an abnormality signal indicating an abnormality to the output adjustment section when the output monitoring unit determines that there is an abnormality in the output signal from the second controller, and
   wherein the output adjustment section performs a logical addition on the output signal from the second controller with the abnormality signal, thereby converting the output signal into a signal of the recessive level when the output monitoring unit determines that there is the abnormality, and outputting the converted signal to the selection section.

* * * * *